United States Patent [19]
Schommer et al.

[11] Patent Number: 5,887,749
[45] Date of Patent: Mar. 30, 1999

[54] FOOD HOLDER

[75] Inventors: Philip E. Schommer, 5744 Fresh Meadow Dr., Macungie, Pa. 18602; David L. Waldron, Riverwoods, Ill.

[73] Assignee: Philip E. Schommer, Macungie, Pa.

[21] Appl. No.: 929,898

[22] Filed: Sep. 15, 1997

Related U.S. Application Data

[63] Continuation of Ser. No. 781,846, Jan. 10, 1997, abandoned, which is a continuation of Ser. No. 588,980, Jan. 19, 1996, abandoned.

[51] Int. Cl.[6] ..................................................... B65D 1/38
[52] U.S. Cl. ........................... 220/575; 220/501; 206/564
[58] Field of Search ................................... 220/575, 500, 220/501; 206/564

[56] References Cited

U.S. PATENT DOCUMENTS

| | | | |
|---|---|---|---|
| 1,756,963 | 5/1930 | Ware | 220/575 |
| 2,096,825 | 10/1937 | Roman | 220/575 X |
| 2,677,350 | 5/1954 | Prestidge et al. | 220/575 X |
| 2,843,287 | 7/1958 | Finley | 220/501 X |
| 3,532,247 | 10/1970 | Bridges | 206/564 X |
| 3,601,277 | 8/1971 | Andrews | 206/564 X |
| 3,850,333 | 11/1974 | Reichert . | |
| 3,924,009 | 12/1975 | Goldberg et al. . | |
| 4,314,650 | 2/1982 | Cillario | 220/500 X |
| 4,879,125 | 11/1989 | Pak . | |
| 5,167,973 | 12/1992 | Snyder | 220/501 X |
| 5,277,920 | 1/1994 | Weaver, Jr. . | |
| 5,328,051 | 7/1994 | Potter et al. | 220/501 X |
| 5,346,710 | 9/1994 | Geitner . | |

*Primary Examiner*—Steven Pollard
*Attorney, Agent, or Firm*—Tim L. Burgess

[57] ABSTRACT

A food container especially for pet feeding has a plurality of compartments at least one compartment of which is circular to house canned wet food. The inside walls of the compartments include a upper rim wall portion set back at a rim wall base elevation between the compartment floors and the container top surface that is the same in all compartments. The setback provides a continuous shoulder lining each compartment adjacent the rim wall base. A lid for the container has at least one closed course protrusion raised in the underside of the lid. The protrusion has peripheral shape and outside dimensions sufficiently corresponding to the peripheral shape and internal dimensions of the rim walls of the circular and the other of the compartments, to interferingly nest the protrusion within the circular and other compartments above the shoulder of the compartments.

13 Claims, 4 Drawing Sheets

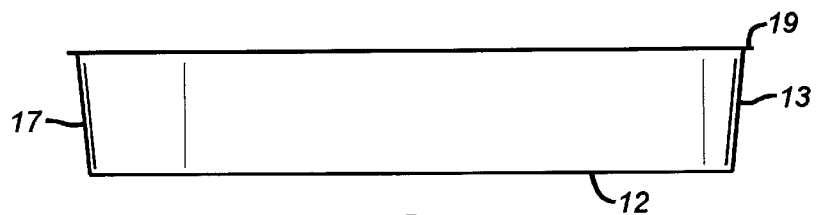
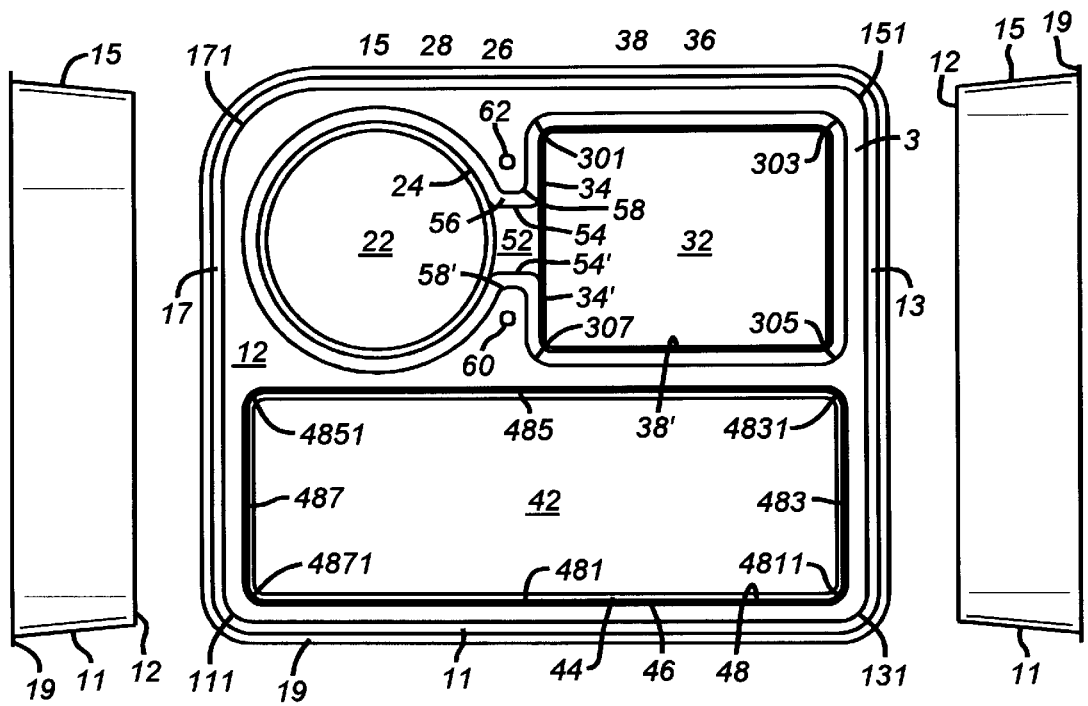
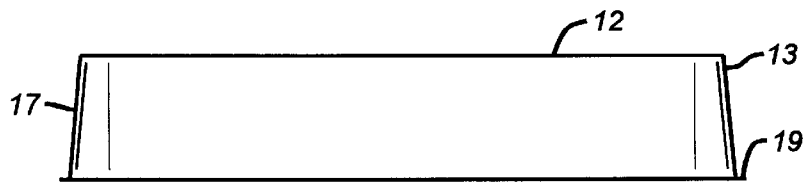

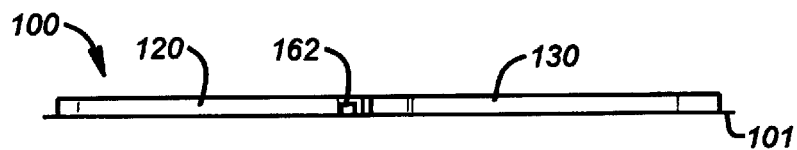
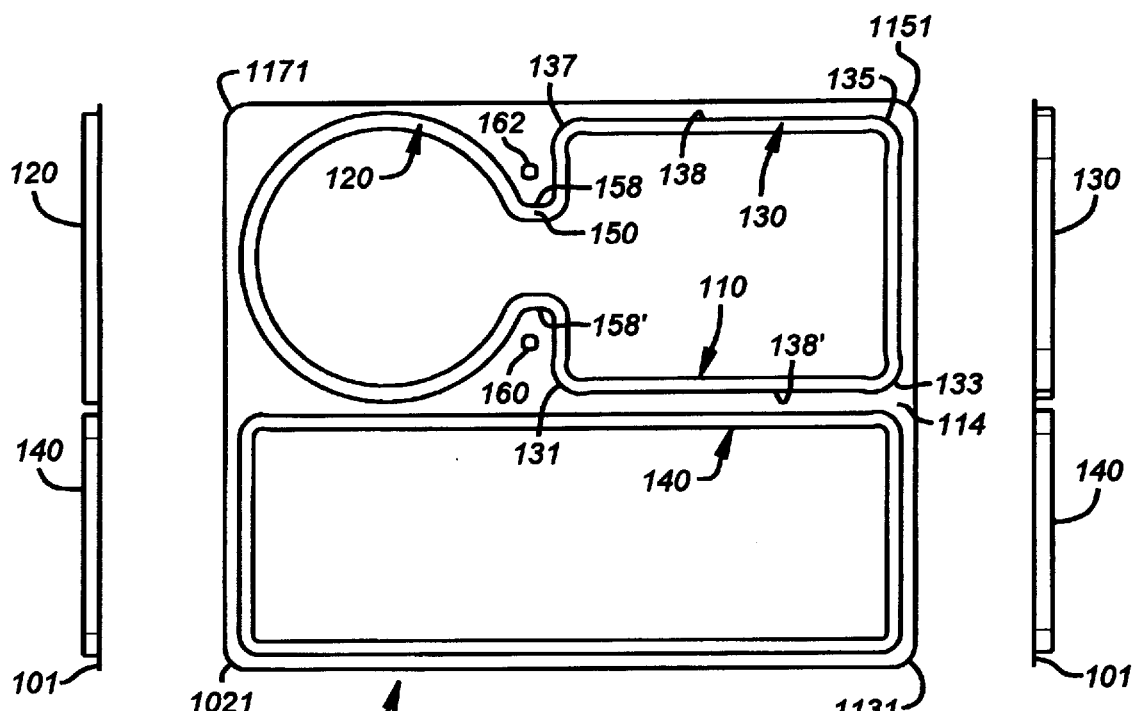
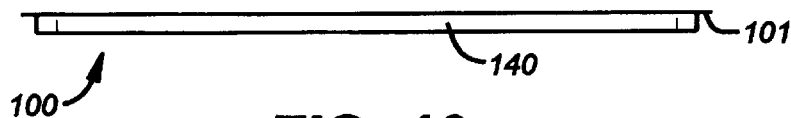

FOOD HOLDER

This application is a continuation of application Ser. No. 08/781,846, filed Jan. 10, 1997, abandoned, a continuation of 08/588,980, filed Jan. 19, 1996, abandoned.

BACKGROUND OF THE INVENTION

1. Field of the Invention

This invention relates to containers for holding food to be eaten directly from the container, and more particularly relates to resealable containers for meals, especially for pet food.

2. Background Information

Pets enjoy variety in their meals, both in flavor and in texture. Dry food is good for pet teeth, but canned wet food is more appealing to pet appetites. In the past, pet owners have purchased dry pet food and canned wet food in separate containers, and then mixed them to feed their pet. Pet owners may also purchase pet treats such as dog biscuits, jerky or other dried meat or meat mimic to feed the pet apart from the dry food and canned wet food. The time absorbing and inconvenience of buying, dispensing and perhaps mixing numerous separately packaged kinds of food among pet owners who have many competing demands for their time has resulted in the pets of many such owners losing out on healthful variety in their meals, as one or the other of the dry, wet or mimic foods is served as time permits.

It is an object of this invention to provide a food holder that is adapted for packaging canned wet meat, dry food bits, and optionally, pet treats, in a convenient easy-to-serve container that doubles as a feeding tray in which wet and dry food can be mixed and water can be placed for drinking, and which can be resealed and refrigerated if all the food is not consumed when served.

SUMMARY OF THE INVENTION

A food holder in accordance with this invention, comprises a container having a planar top surface with opposing sides, a base, and peripheral outside walls uniting the top surface and base. A plurality of compartments are formed into the top surface, the compartments each having a floor, an inside wall and a top opening. At least one compartment is circular to house canned wet food. The inside walls of the compartments include a upper rim wall portion set back at a rim wall base elevation between the compartment floors and the container top surface that is the same in all compartments. The setback provides a continuous shoulder lining each compartment adjacent the rim wall base.

A lid for the container comprises a planar surface having perimeter sides, an upper side and an underside. At least one closed course protrusion is raised in the underside of the planar surface of the lid. The protrusion has peripheral shape and outside dimensions sufficiently corresponding to the peripheral shape and internal dimensions of the rim walls of the circular and the other of the compartments, to interferingly nest the protrusion within the circular and other compartments above the shoulder of the compartments. The protrusion has a height substantially equal to the height of the container rim walls and preferably has a face width substantially equal to the width of the shoulder of the compartments, allowing the face of the protrusions in the nested position to rest on the shoulder.

Preferably one of the compartments has a four sided configuration with radiused inner corners connecting its inside walls, and the protrusion of the lid has a conformingly configures shape with radiused outer corners of sufficiently larger radius than the radius of the radiused inner corners of the inner walls of the four sided compartment above the container inside wall shoulder, to enhance interferingly nesting the conforming portion of the first protrusion within the four sided compartment above the shoulder in that compartment.

The food holder is used in a method of feeding a pet by including a can of wet food in the circular compartment and bits of dry food in the parallelogram compartment. The lid is removed from the interference fit on the container, and the can of wet food is removed from the circular compartment and opened. The wet food is extracted from the can and may be placed into the circular compartment or mixed with the dry food in the parallelogram compartment. If the latter, a drinking liquid is poured into the circular compartment. The features of the container and lid allow the lid to be resealed to the container after permitting the pet to feed from the container.

DESCRIPTION OF THE DRAWINGS

FIG. 1 is a top plan view of a preferred embodiment of the container of this invention, with the front of the container at the lower side of the view and the back of the container at the top of the view.

FIG. 2 is a left side elevational view of the container of FIG. 1 as if it were viewed looking at the left side of the container of FIG. 1 after rotating the sheet 90 degrees counterclockwise.

FIG. 3 is a right side elevational view of the container of FIG. 1 as if it were viewed looking at the right side of the container of FIG. 1 after rotating the sheet 90 degrees clockwise.

FIG. 4 is a front elevational view of the container of FIG. 1.

FIG. 5 is a back elevational view of the container of FIG. 1 as if it were viewed looking at the back side of the container of FIG. 1 after rotating the sheet 180 degrees.

FIG. 7 is a top plan view of the lid which attaches to the container of FIG. 1 with the front towards the bottom and the back at the top.

FIG. 8 is a left side elevational view of the lid of FIG. 7 as if it were viewed looking at the left side of the container of FIG. 1 after rotating the sheet 90 degrees counterclockwise.

FIG. 9 is a right side elevational view of the lid of FIG. 7 as if it were viewed looking at the right side of the container of FIG. 1 after rotating the sheet 80 degrees clockwise.

FIG. 10 is a front elevational view of the lid of FIG. 7.

FIG. 11 is a back elevational view of the lid of FIG. 7 as if it were viewed looking at the back side of the lid of FIG. 7 after rotating the sheet 180 degrees.

DESCRIPTION OF THE PREFERRED EMBODIMENT

Figure 6:
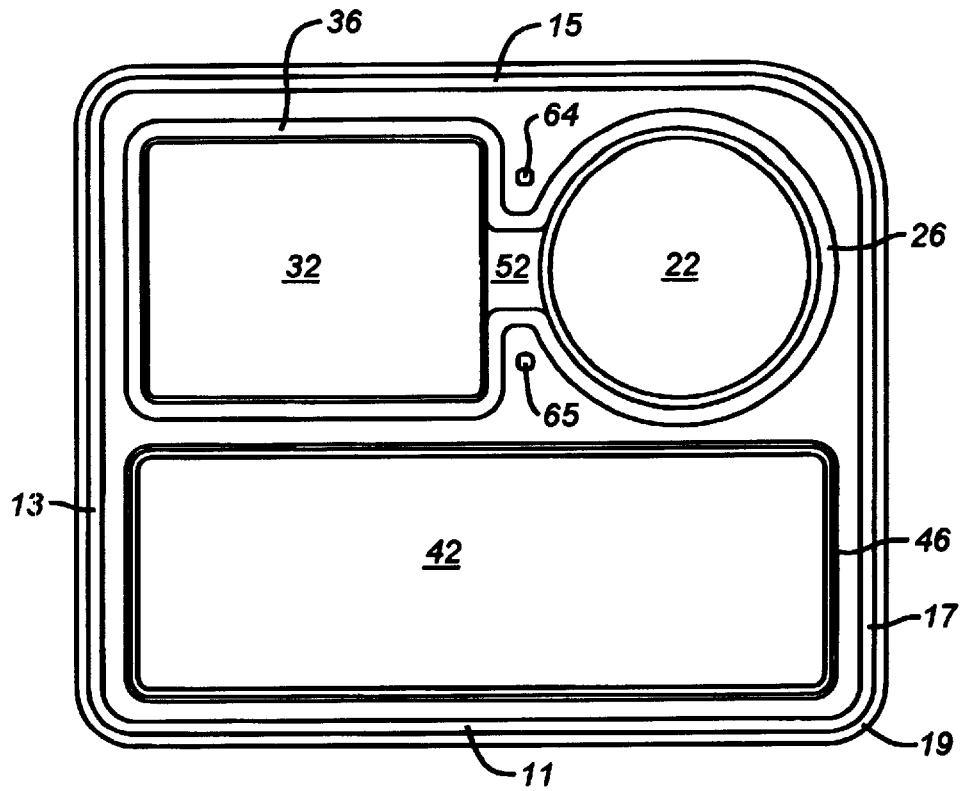
FIG. 6 is a bottom plan view of the container of FIG. 1.
Figure 12:
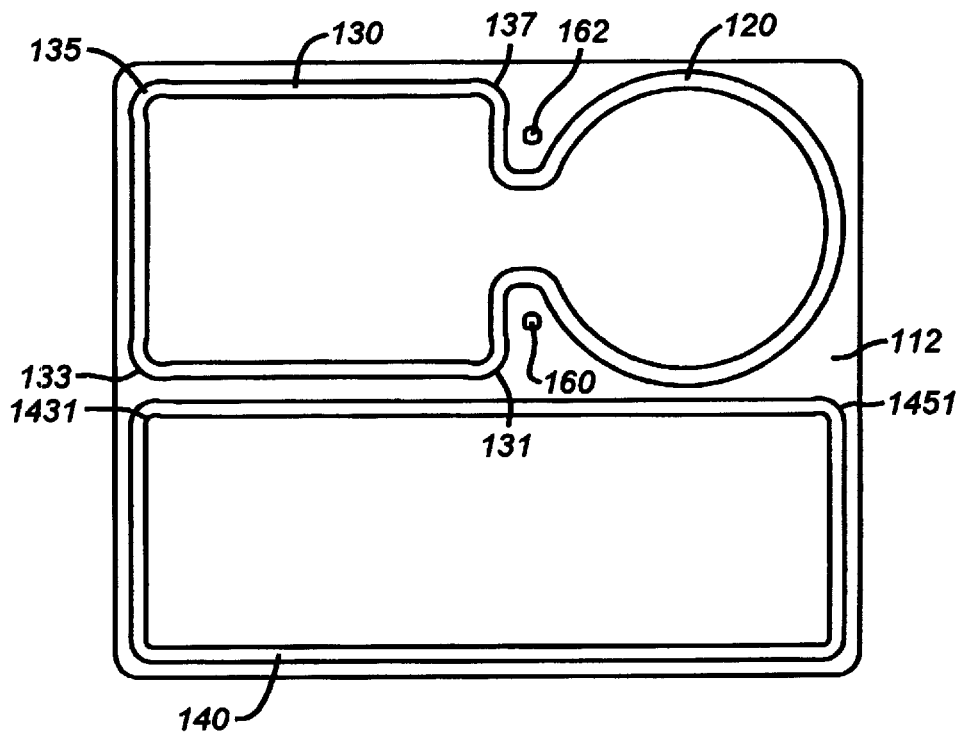
FIG. 12 is a bottom plan view of the lid of FIG. 7.
Figure 13:
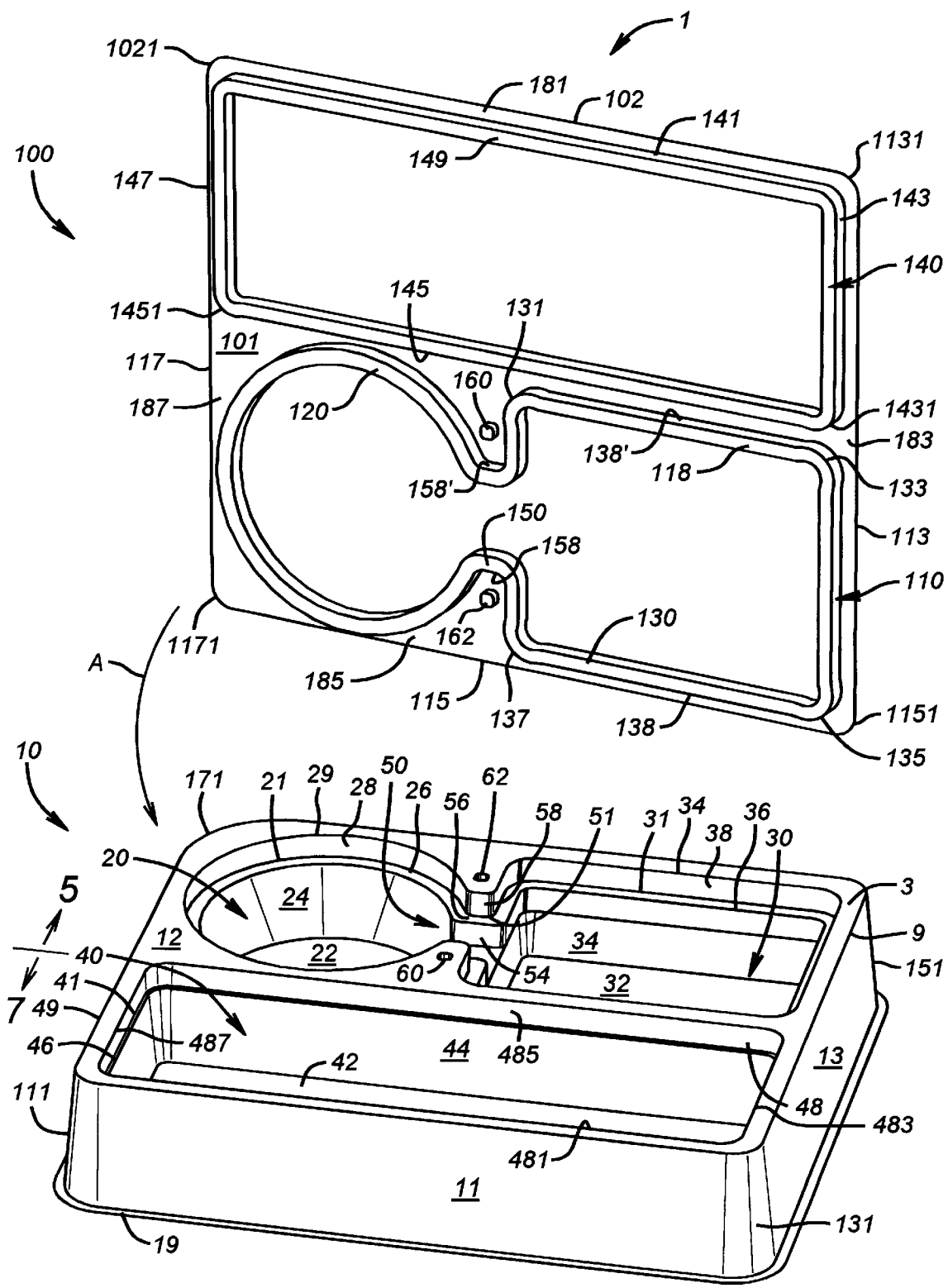
FIG. 13 is a perspective view of the container of FIG. 1 and the lid of FIG. 7.

Referring to FIG. 13, reference numeral 1 indicates generally a food holder that comprises a container 10 and a lid 100 indicated attachable to container 10 by arrow A. The container 10 and lid 100 preferably are formed from a thermoplastic material, suitably high density polyethylene or polypropylene.

Container 10 has a planar top surface 12 with opposing sides, suitably in the shape of a parallelogram, that is, parallel opposing sides (11 and 15, 13 and 17), but the sides may be curvilinear. Preferably the parallelogram is a rectangle with radiused corners as hereinafter detailed, but it may also be a square. A rectangular configuration is preferred for providing the maximum food compartment volume within suitably rectangular retail packaging for the food holder until consumer use. Container 10 includes a base 19 turned out as a foot at the bottom. Peripheral outside walls 11, 13, 15 and 17 unite the top surface 12 and base 19. A gentle edge 9 is at the union of the top surface 12 and each outside wall 11, 13, 15 and 17.

First, second and third compartments, 20, 30 and 40, respectively, are formed into the top surface sufficiently interiorly of union of the top surface 12 and the outside walls 11, 13, 15, 17 to provide a planar margin 3 along the four sides of the top surface periphery. The first and second compartments 20 and 30 are formed in the back half 5 of the top surface 12, and the third compartment 40 is formed in the other (front) half 7 of top surface 12 alongside the first and second compartments 20 and 30. First, second and third compartments 20, 30 and 40 each have a floor, an inside wall and a top opening: respectively, for first compartment 20, floor 22, inside wall 24, and top opening 29; for second compartment 30, floor 32, inside wall 34, and top opening 39; and for third compartment 40, floor 42, inside wall 44, and top opening 49

First compartment 20 is circular at any elevation, by which is meant that, in any front to back horizontal section, compartment 20 will have a circular shape, although the vertical shape may, and preferably does, taper outwardly slightly, at least below the level of the shoulder 26 hereinafter described. This taper gives a pleasing appearance to the compartment and also assists in extracting the container from the mold in which as a thermoplastic it is formed.

The second and third compartments 30 and 40 are parallelograms in any elevation, by which is meant that at any front to back horizontal section, compartments 30 and 40 will have the shape of a parallelogram in which opposing sides are parallel, although the vertical shape may, and preferably does, taper outwardly slightly, at least below the level of the shoulders 36, 46 hereinafter described. As with a taper for compartment 20, this taper not only is decorative but also assists in extracting the container from the mold in which as a thermoplastic it is formed. In addition compartment 30 has radiused inner corners 301, 303, 305 and 307 that connect inside walls 34, and compartment 40 has radiused inner corners 401, 403, 405 and 407 that connecting the inside walls 44.

Third compartment 40 preferably has a larger area of floor 42 than the individual areas of floors 22 and 32 of each of the respective first and second compartments 20 and 30. More preferably, third compartment 40 has a larger area of floor 42 than the combined areas of floors 22 and 32 of each of the respective first and second compartments 20 and 30. This larger area and associated volume of compartment 40 permits a substantial amount of dry pet food to be packaged in the container yet have room also to accommodate wet food (extracted from a can from compartment 30) that is added to compartment 40 and mixed with the dry food there.

The floors 22 and 42 of the respective first and third compartments 20 and 40 have a lower elevation than the floor 32 of the second compartment. A channel 50 interconnects first compartment 20 with second compartment 30. Channel 50 has two opposing inside walls 54 and 54'. Wall 54 is continuous with adjacent inside wall 24 of first compartment 20 and adjacent inside wall 34 of second compartment 30. Wall 54' is continuous with adjacent inside wall 24 of the first compartment and adjacent inside wall 34' of second compartment 30. Channel 50 has a floor 52 of higher elevation than floor 32 of second compartment 30. Channel 30 forms a strengthening rib structure connecting compartments 20 and 30 and gives rigidity to container 10 especially while it disproportionately holds the heavier weight of the wet canned food in container 20 and the lighter weight of pet treats in compartment 30.

Inside walls 24, 34, and 44 of the compartments and inside walls 54 of channel 50 include an upper rim wall portion, respectively, 28, 38, 48 and 58, that is set back at an elevation beginning at the rim wall base, respectively at 21, 31, 41 and 51, which is located between the floors 22, 32, 42 and 52 and container top surface 12. The elevation at bases 21, 31, 41 and 51 is the same in all compartments 20, 30 and 40 and in channel 50. This rim wall setback provides a continuous shoulder 26, 56 and 36 lining compartment 20, channel 50 and compartment 30 and a continuous shoulder 46 lining compartment 40. The shoulder 46 of the third compartment 40 is of smaller width than the shoulders 26 and 36 of the first and second compartments 20 and 30 and the shoulder 56 of channel 50, for reasons described below.

Top surface 12 of container 10 also includes therein a pair of parallelogram recesses 60 and 62 with radiused corners and bottoms 64 and 65. Recesses 60 and 62 are situated in top surface 12 on each side of channel 50 between first compartment 20 and second compartment 30.

Peripheral outside walls 11, 13, 15 and 17 of container 10 have radiused outer corners, e.g. as at 111, 131, 151, and 171. Peripheral outside walls 15 and 17 adjacent first compartment 20 include an outer corner 171 having both (i) a larger radius than the other three outer corners 111, 131, 151, and (ii) a smaller radius at any elevation thereof than the radius of first compartment 20 at the same elevation. This structure for corner 171 not only contributes in providing a look to the container that is distinctive as a whole, but also assists the removal of the interferingly fit lid 100, as described below.

Referring now to lid 100 for the container, lid 100 comprises a planar surface parallelogram 101 having perimeter sides 102, 113, 115 and 117 with radiused corners, e.g. as at 1111, 1131, 1151, 1171, an upper or top side 112 (FIG. 7) and a bottom or underside 114 (FIG. 13 and FIG. 10). Perimeter sides 102, 113, 115 and 117 are sufficiently smaller then the corresponding container sides 11, 13, 15 and 17 for the lid sides 102, 113, 115 and 117 to fit within container 10 top surface edges 9 at each of sides 11, 13, 15 and 17. Thus the lid flange portions 181, 183, 185 and 187 bounded by lid perimeters 111, 113, 115 and 117 lay on the top surface margin 3 at each container side 11, 13, 15 and 17. The radii of the lid corners 1021, 1131, 1151, 1171 are substantially the same and are substantially equal to the radii of the three outside container corners 111, 131 and 151. Because outer container corner 171 has a larger radius than the other three outer corners 111, 131, 151, and because lid corner 1171 has substantially the same smaller radius as the other three outside container corners 111, 131 and 151, lid corner 1171 extends over the edge 9 of container corner 171 while all the rest of lid 100 lays inside the edge 9 of each container side 111, 113, 115, 117. The resulting extension of lid corner 1171 over the corner 171 of container 10 provides a tab 1171 that allows lid 100 to be grasped by the tab and pulled to overcome the means for interference friction fit provided to attach lid 100 to container 10, as now described.

Lid 100 has first and second closed course protrusions 110 and 140 raised alongside each other in underside 114 of lid 100. First protrusion 110 has a circular portion 120 joined by a neck portion 150 to a generally parallelogram portion 130. Circular portion 120 of first protrusion 110 has an outer diameter sufficiently approximating the inner diameter of container rim wall 28 of first compartment 20, for adaption to interferingly coaxially nest within first compartment 20 above the shoulder 26 of first compartment 20.

The parallelogram portion 130 of the first protrusion 110 has opposing side (e.g., 138, 138') outside distances sufficiently approximating the corresponding opposing rim walls (e.g. 38, 38') inside distances of the second compartment 30, to interferingly coaxially nest within first compartment 30 above the shoulder 36. Portion 130 of the first protrusion 110 also has radiused outer corners 131, 133, 135, and 137 of sufficiently larger radius than the radius of the radiused inner wall corners 301, 303, 305 and 307 of second compartment 30 above shoulder 36, to enhance interferingly fit of parallelogram portion 130 of first protrusion 110 within second compartment 30 above second compartment shoulder 36.

The neck portion 150 of first protrusion 110 has opposing side (158 and 158') outside distances sufficiently approximating the corresponding opposing rim walls (58 and 58') inside distances separating rim walls 58 and 58' of channel 50, to interferingly nest neck portion 150 of first protrusion 110 within channel 50 above channel shoulder 56.

First protrusion 110 has a height substantially equal to the height of the container rim walls 28, 58 and 38 and a face width substantially equal to the width of shoulders 26 and 36, respectively, of first and second compartments 20 and 30, and shoulder 56 of channel 50, to allow protrusion face 118 to rest on shoulders 26, 56 and 36 when protrusion 110 is in the nested position on container 10. This enables lid 100 and container 10 to mutually enhance rigidity of the other.

A pair of circular pegs 160 and 162 raised in the underside 114 of the planar surface of lid 100 have a height substantially equal to the depth of the pair of container recesses 60 and 62. Pegs 160 and 162 have a radius and are separated by a distance on their centers sufficient to dispose them in container recesses 60 and 62 in an interfering fit. This peg/recess interference attachment provides additional fastening security adjacent channel 50 for the interference fit given by protrusion 110 at channel 50 and compartments 20 and 30.

Second protrusion 140 has a parallelogram shape with opposing side (e.g., 141, 145 and 143, 147) outside distances sufficiently approximating the corresponding opposing rim walls (e.g. 481 485, and 483, 487) inside distances of the third compartment 40, and also has at least two radiused outer corners 1451 and 1431 that are adjacent first protrusion 110 and are of sufficiently larger radius than the radius of the radiused corners 4851 and 4831 of rim wall 48 to interferingly nest second protrusion 140 within third compartment 40 above third compartment shoulder 46. Providing an enhanced interference fit at corners 4851 and 4831 but not at corners 4811 and 4871 allows easier removal of lid 100 by grasping corner tab 171 of lid 100 and pulling up the lid toward the front of container 10. To assist ease of relieving the interference fit for removal of lid 100, shoulder 46 has a smaller width than shoulders 26, 56 and 36, with the preponderance of interference fit for protrusion 140 being provided by radiused lid corners 1451 and 1431.

Second protrusion 140 has a height substantially equal to the height of the container rim walls 48 and a face width at least as wide as the width of shoulder 46 of third compartments 40, allowing protrusion face 149 to rest at least partially on shoulder 46 when protrusion 140 is in the nested position on container 10.

Container 10 in preferred use is filled with a can of wet pet food in compartment 20, pet treats in compartment 30 and dry food bits in compartment 40, then sealed by placing lid 100 on the container with interfering fit attachment by the means described. Food holder 1 is then placed in a suitable sales package and distributed through retail outlets to consumers. A consumer removes food holder 1 from the sales package and grasping corner tab 171, lifts lid 100 from the container 10. The consumer removes the can of wet food from compartment 20, extracts wet food from the can, and deposits it suitably in either compartment 20 or more preferably, mixes it with the dry food in compartment 40. The pet treats are left for snacking. If some of the food is not entirely eaten, the consumer may apply the lid to the container and reseal it, refrigerating it if desired for later use.

Having described the preferred embodiment of our invention, our invention is not to be limited to it but is of the full scope set forth in the claims which follow.

We claim:

1. A food holder, comprising:

a container having a plurality of compartments formed therein, said compartments each having a floor, an inside wall and a top opening at a top surface, said inside walls of said compartments including a upper rim wall portion set back at a rim wall base elevation between the compartment floors and the container top surface, said setback providing a continuous shoulder lining each compartment adjacent the rim wall base, and a separate companion lid for said container, said lid comprising at least one closed course protrusion raised in an underside of said lid, said protrusion having peripheral shape and outside dimensions sufficiently corresponding to the peripheral shape and internal dimensions of said rim walls of said compartments, to sealably nest said protrusion within said compartments above said shoulder of said compartments.

2. The container of claim 1 in which one of said compartments contains a sealed wet meal and one of said compartments contains a dry meal.

3. The food holder of claim 1 wherein at least a first compartment is round and said compartment contains a wet meal sealed in a can.

4. The food holder of claim 1 wherein a second compartment has four connecting inside walls with radiused inner corners, and said protrusion of said lid has radiused outer corners of sufficiently larger radius than the radius of said radiused inner corners above said shoulder, for providing an interference fit for sealably nesting said protrusion within said second compartment above said shoulder thereof.

5. The food holder of claim 4 in which the top surface of the container includes therein a pair of rectilinear recesses with depth to a bottom, said recesses being situated in said top surface between said first and second compartments, and wherein said lid comprises a pair of circular pegs raised in the underside of said planar surface of said lid and having a height substantially equal to the depth of said pair of container recesses, said pegs having a radius and being separated by a distance on centers adapted to dispose them in said rectilinear recesses in an interfering fit.

6. The food holder of claim 4 in which said container has peripheral outside wall with radiused outer corners, the outer corner between said peripheral outside walls adjacent said first compartment having a larger radius than the other three outer corners, any radius of said outer corner adjacent said first compartment being smaller than any radius of the first compartment, and wherein said lid perimeter sides have radiused corners, the radius of the lid corners being substantially the same and substantially equal to the radius of said three outside corners of the container not adjacent said first compartment.

7. The food holder of claim 4 having a third compartment formed alongside both said first and second compartments, said third compartment also having four sides.

8. The food holder of claim 7 in which an edge marks the union of the top surface and each outside wall, the first, second and third compartments are formed into said top surface sufficiently interiorly of union of said top surface and said outside walls to provide a planar margin along the four sides of the top surface periphery, and said lid perimeter sides are sufficiently smaller then the corresponding sides of the container for the sides of the lid to fit within said container top surface edges and lay on said top surface margin except at said container corner adjacent the first compartment.

9. The container of claim 7 wherein said lid has first and second closed course protrusions raised alongside each other in the underside of said lid, said first protrusion having a round portion and a four sided portion sufficiently corresponding to the peripheral shape and internal dimensions of said rim walls respectively of said first and second compartments, to sealingly nest said first protrusion within said first and second compartments above said shoulders of said first and second compartment, and said second protrusion having a four sided shape sufficiently corresponding to the peripheral shape and internal dimensions of said rim wall of said third compartment, to sealingly nest said second protrusion within said third compartment above said third compartment shoulder.

10. The food holder of claim 9 wherein said third compartment of said container has radiused inner corners connecting its four inside walls above said shoulder, and said four sided portion of said second protrusion has radiused outer corners of larger radius than the radius of said radiused inner corners of third compartment sufficiently for interferingly nesting said four sided portion of said second protrusion within said third compartment above said third compartment shoulder.

11. A method of feeding an animal which comprises:

providing a container having a plurality of compartments formed therein, said compartments each having a floor, an inside wall and a top opening at a top surface, said inside walls of said compartments including a upper rim wall portion set back at a rim wall base elevation between the compartment floors and the container top surface, said setback providing a continuous shoulder lining each compartment adjacent the rim wall base, and a separate companion lid for said container, said lid comprising at least one closed course protrusion raised in an underside of said lid, said protrusion having peripheral shape and outside dimensions sufficiently corresponding to the peripheral shape and internal dimensions of said rim walls of said compartments, to sealably nest said protrusion within said compartments above said shoulder of said compartments, said container having a sealed wet meal in one compartment and a dry meal in another compartment, removing said lid unsealing the sealed wet meal and mixing it and the dry meal to provide a mixed meal in at least one compartment, and allowing the animal to feed on the mixed meal.

12. The method of claim 11 further comprising adding a drink to a compartment not containing the mixed meal.

13. The method of claim 11 further comprising, after allowing the animal to feed, applying said lid to the container to close the container and preserve for a second feeding any mixed meal not eaten.

* * * * *